United States Patent
Todasco et al.

(10) Patent No.: US 9,974,000 B2
(45) Date of Patent: *May 15, 2018

(54) WIRELESS BEACON DEVICES FOR USE IN MANAGING TRANSPORTATION SERVICE TERMINALS

(71) Applicant: PAYPAL, INC., San Jose, CA (US)

(72) Inventors: Michael Charles Todasco, Santa Clara, CA (US); Megan Marie Williams, San Jose, CA (US); Michael Hwang, San Francisco, CA (US); Michelle Serrano, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/444,064

(22) Filed: Feb. 27, 2017

(65) Prior Publication Data
US 2017/0303184 A1    Oct. 19, 2017

Related U.S. Application Data

(63) Continuation of application No. 14/543,440, filed on Nov. 17, 2014, now Pat. No. 9,585,079.

(51) Int. Cl.
*H04W 40/24* (2009.01)
*H04W 4/00* (2018.01)
(Continued)

(52) U.S. Cl.
CPC ......... *H04W 40/244* (2013.01); *H04W 4/008* (2013.01); *H04W 76/021* (2013.01); *H04W 88/02* (2013.01)

(58) Field of Classification Search
CPC ...... H04B 5/00; H04B 5/0025; H04B 5/0062; H04W 84/18; H04W 8/005; H04W 48/08; H04W 48/16; H04W 76/025
See application file for complete search history.

(56) References Cited

U.S. PATENT DOCUMENTS

| | | | | |
|---|---|---|---|---|
| 2002/0049054 A1* | 4/2002 | O'Connor | ............. | G08G 1/123 455/426.1 |
| 2002/0077122 A1* | 6/2002 | Yule | ...................... | G08G 1/005 455/456.3 |

(Continued)

*Primary Examiner* — Nay A Maung
*Assistant Examiner* — Maryam Soltanzadeh
(74) *Attorney, Agent, or Firm* — Haynes & Boone, LLP

(57) ABSTRACT

There are provided systems and methods for wireless beacon devices for use in managing transportation service terminals. A user may travel with a device, such as a communication device, that includes a communication module that may utilize specialized hardware features to establish short range wireless communications with nearby wireless beacons. The wireless beacons may be established at or nearby transportation service terminals, such as bus/train stops. The beacon may provide the aforementioned communication services with the communication device and be utilized to determine whether the user will utilize a transportation service for the terminal. If the user wishes to utilize the transportation service, a transportation service may be alerted. The user may also be alerted of an expected time of arrival for the transportation service, other transportation services available at the transportation terminal, and/or of nearby transportation terminals.

20 Claims, 5 Drawing Sheets

(51) Int. Cl.
*H04W 76/02* (2009.01)
*H04W 88/02* (2009.01)

(56) References Cited

U.S. PATENT DOCUMENTS

| | | |
|---|---|---|
| 2005/0096013 A1 | 5/2005 | Lehikoinen et al. |
| 2011/0222421 A1* | 9/2011 | Jana .................... H04L 63/1441 370/252 |
| 2013/0143499 A1* | 6/2013 | Ando .................... H04W 4/021 455/41.2 |
| 2014/0210650 A1 | 7/2014 | Kim et al. |
| 2015/0134374 A1 | 5/2015 | Schulz et al. |
| 2015/0269638 A1* | 9/2015 | Chatterton ......... G06Q 30/0281 705/5 |

* cited by examiner

WIRELESS BEACON DEVICES FOR USE IN MANAGING TRANSPORTATION SERVICE TERMINALS

CROSS REFERENCE

This application is a continuation of U.S. patent application Ser. No. 14/543,440 filed Nov. 17, 2014, which is incorporated herein by reference in its entirety.

TECHNICAL FIELD

The present application generally relates to wireless beacon devices for use in managing transportation service terminals and more specifically to placing wireless beacon devices nearby or at bus stops, train stations, and other transportation terminals so that approaching transportation services may be informed of people at or approaching the terminal who may utilize one of the transportation services.

BACKGROUND

Transportation services, such as buses, trains, subways, taxis, and/or other services that may offer transportation to a user between two or more points and may utilize terminal locations where a user may visit in order to utilize the transportation service. For example, bus stops and/or subway stops may be located throughout a city in order to offer transportation to users in the city. Certain transportation services are required to stop at every terminal within a route that the transportation service travels. Thus, the transportation service may waste valuable time stopping at terminals where no users access or utilize the transportation service. Other transportation services may wait until a user requests use of the service at a terminal or is physically waiting at the terminal prior to the transportation service picking up or responding to the users request to utilize the transportation service. Thus, users may either miss a transportation service while running up to a terminal or also waste valuable time waiting for a transportation service to arrive at the terminal.

Figure 1:
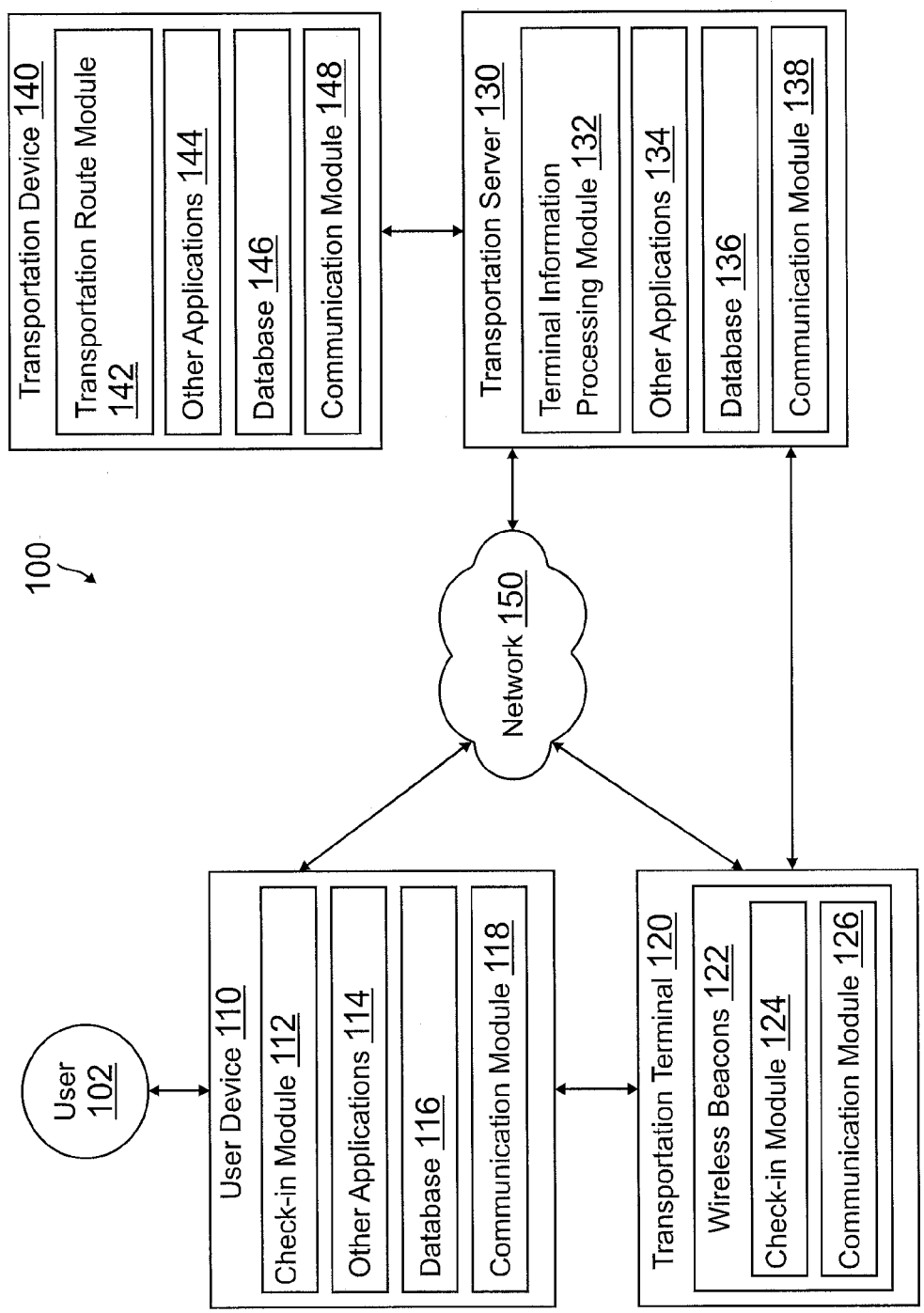
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized with wireless beacon devices for use in managing transportation service terminals Systems suitable for practicing methods of the present disclosure are also provided.

Various transportation terminal locations (e.g., bus/subway stops, train stations, shuttle pickup locations, taxi service locations, and other terminal locations where a user may utilize a transportation service) may provide short range wireless communications with a communication device for a user, such as through beacons using Bluetooth Low Energy (BLE), LTE Direct, or other communication protocol. These beacons may be set up at the terminal location, such as at or nearby an entrance to the terminal, transportation service pickup location, and/or payment location for use of the transportation service. The beacons may communicate with communication devices in possession of users in order to connect to the device and determine the user is in proximity to the beacon. The beacons may provide additional functionality, such as establishing a connection with a transportation management device or server to provide the transportation management device/server a notification that the user has been detected at the transportation terminal. Thus, the beacons may provide proximity detection of users at the transportation terminal in order to determine if one or more of the users wishes to utilize the transportation service.

Thus, these beacons at transportation terminal locations may communicate with the communication device in possession of the user through Bluetooth Low Energy (BLE), LTE Direct, or another communication protocol receivable by the communication device. When establishing a connection, the beacon may emit a communication signal including an identifier for the beacon, the user, and/or the transportation management service administering the beacons (e.g., a service provider, transportation provider, and/or town/city/airport/etc. management). A check-in module of the communication device may execute specialized hardware and/or software to passively monitor for the short range wireless communications, for example, through a communication module. When the device detects the signal and verifies the one or more identifiers, both the device and the beacon may ramp up in power and establish a connection, where the connection may further enable the device to communicate additional information to the wireless beacon, such as check-in information (e.g., an identifier) and/or other stored data for the user and/or communication device. The beacon may be connected to a networked device at the terminal, or the beacon may include network functionality to communicate with other devices and/or servers itself.

Thus, a beacon enables the user's communication device to establish a connection, communicate check-in or other information (e.g., an identifier for the user and/or communication device), and/or complete a check-in with the terminal location. The check-in may be completed automatically when the communication device is in range of the beacon, or may be completed after prompting the user to check-in when the communication device is in range of the beacon. The wireless beacon(s) may be range limited to correspond to a sub-area of a transportation terminal location, such as by limiting the signal strength and/or directionality of the beacon and/or utilizing the physical boundaries of the terminal location (e.g., walls, boundaries, etc.). The sub-area may correspond to a ticketing/payment counter of the terminal, a walkway or boarding area/station of the terminal, an entryway for the terminal, nearby seating for use at the terminal, or other areas at or nearby the terminal. Thus, the communication device may connect to one beacon in a sub-area of the terminal, multiple beacons in more than one sub-area of the terminal, and/or one or more beacons corresponding to the entire terminal.

Utilizing information received from the one or more beacons connected to the communication device, a transportation device/server managing the transportation services that utilize the terminal may determine that a user at the terminal wishes to utilize one of the transportation services (e.g., a bus, subway, train, taxi, shuttle, etc.). For example, based on an amount of time the communication device stays connected to the beacon(s), the transportation device/server may determine that the user in possession of the communication device is waiting for a transportation service. Moreover, the beacon(s) may receive information about a schedule/calendar, travel route, past history of transportation service use, or purchased fare for a transportation route from the communication device. Utilizing more than one beacon connection with the communication, the device/server may also determine that the user is approaching a boarding platform, ramp, stairway, or other area in order to access the transportation service. The transportation device/server receives the connection information from the wireless beacon(s) utilizing a communication module and stores the connection information to a non-transitory memory of the transportation device/server. The transportation device/server may then utilize the aforementioned information to determine that the user may wish to access and utilize the transportation service for travel.

Once the transportation device/server has determined that the user wishes to utilize a transportation service, the device/server may alert the transportation service through a device associated with the transportation service (e.g., a GPS module, radio unit, or other device in communication with the transportation device/server). The transportation device/server may alert the transportation service that a user is waiting at a specified transportation terminal so that the transportation service may pick up the user for travel. The transportation service may be alerted of the user's identity, image, destination endpoint, schedule/calendar, travel route, and/or pre-purchased fare. Similarly, the user may be alerted of a time until arrival of the transportation service and an identity of the transportation service (e.g., bus/car/subway number). The transportation service may also be alerted of the transportation terminal's location, such as on a map, so that the transportation service may service the user. Still further, the transportation service may be alerted of a number of users at the transportation terminal (e.g., through other connections between wireless beacon(s) and communication device(s)) so that the transportation service may determine whether the transportation service may pick up all users, or if another transportation service would be required. If the transportation service is at or near maximum capacity, the transportation device/server may be alerted (e.g., from the transportation service, through a number of users connected to a wireless beacon associated with the transportation services, and/or through a number of purchased fares or users accessing the transportation service). Thus, the transportation device/server may alert a second transportation service serving the transportation terminal that one or more of the users may be picked up. If the transportation device/server is required to alert the second transportation service, the user may be alerted of the delay and the time until arrival of a next transportation service. The user may also be alerted of nearby transportation terminals that the user may utilize to access the same or similar transportation services.

In various embodiments, the transportation device/server may assist a plurality of transportation services all having separate routes, such as a bus system within a city. Thus, a transportation terminal may have multiple transportation services that each take their travelers on different routes to destination endpoints. In order to determine which of the transportation services a user is utilizing, the transportation device/server may utilize a schedule/calendar of the user received from the communication device, purchased fare of the user, and/or a prior travel history and times of travel for the user. Thus, the transportation device/server may alert the correct transportation service using the aforementioned information. The transportation device/server may also request confirmation from the user through the communication device that the alerted transportation service is correct. If the user wishes to travel on a different transportation service, the user may utilize the communication device to make a different selection.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a transportation terminal 120 having wireless beacons 122, a transportation server 130, and a transportation device 140 in communication over a network 150. User 102 may visit transportation terminal 120 in order to access a transportation service. One or more of wireless beacons 122 may connect with user device 110 when user 102 is in proximity to transportation terminal 120. Transportation server 130 may determine that user 102 wishes to utilize the transportation service associated with transportation terminal 120 using wireless beacons 122. Transportation server 130 may then alert the transportation service through transportation device 140 that is associated with the transportation service.

User device 110, transportation terminal 120, wireless beacons 122, transportation server 130, and transportation device 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with wireless beacons 122, transportation server 130, and/or transportation device 140. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in module 112, other applications 114, a database 116, and a communication module 118. Check-in module 112 and other applications 114 may correspond to executable processes, procedures, and/or applications with associated hardware. In other embodiments, user device 110 may include additional or different hardware and software as required.

Check-in module 112 may correspond to one or more processes to execute modules and associated devices of user device 110 to establish a connection with one or more of wireless beacons 122, including a check-in with transportation terminal 120 and/or a sub-area of transportation terminal 120. In this regard, check-in module 112 may correspond to specialized hardware and/or software utilized by user device 110 with wireless beacons 122 to establish a connection and complete a check-in. Check-in module 112 may then provide user 102 information about available transportation services available at transportation terminal 120 and/or alert at least one transportation service of the arrival of user 102. A connection by check-in module 112 with one or more of wireless beacons 122 may provide and/or verify the identity of user 102, including transmission of an identifier for user 102 and/or user device 110. Thus, check-in information may be established when a connection is made by check-in module 112 with one or more of wireless beacons 122 that includes one or more identifiers.

In various embodiments, check-in module 112 receives short range wireless communications from one or more of wireless beacons 122 through communication module 118 at transportation terminal 120 and transmits information to wireless beacons 122, including check-in information for a check-in process that associates user 102 with the one or more of wireless beacons 122 connected with user device 110. For example, wireless beacons 122 may be located at and throughout transportation terminal 120 and set up to communicate with user device 110 when user device 110 is in proximity to wireless beacons 122. For example, wireless beacons 122 may correspond to a single wireless beacon associated with all of transportation terminal 120. Wireless beacons 122 may also correspond to a sub-location/area of transportation terminal 120 (e.g., at an entrance or walkway leading up to transportation terminal 120, at a payment counter/machine/turnstile for transportation fare at transportation terminal 120, at an access ramp/stairs at transportation terminal 120, etc.). Thus, wireless beacons 122 may be range limited to connect only with devices (e.g., user device 110) within the specified area, such as a radius around wireless beacons 122, a distance away from wireless beacons 122, and/or a signal direction for wireless beacons 122. When user device 110 enters the proximity radius for one or more of wireless beacons 122, user device 110 and the one or more of wireless beacons 122 may connect and check-in information including an identifier for user 102 and/or user device 110 may be transmitted to the connected beacons of wireless beacons 122.

Check-in module 112 may execute in the background of an operating system of user device 110 and be configured to establish connections, using communication module 118 of user device 110, with one or more of wireless beacons 122. The connection may be established with or without user input from user 102. For example, wireless beacons 122 may broadcast a token, such as a universally unique identifier (UUID), for reception by check-in module 112, as will be explained in more detail herein. Check-in module 112 may utilize communication module 118 of user device 110 to receive the token from wireless beacons 122. If check-in module 112 acknowledges the UUID as identifying transportation terminal 120, wireless beacons 122, transportation server 130, and/or transportation device 140 (e.g., if check-in module 112 determines the UUID corresponds to a request to establish a communication channel and/or process and complete a check-in), check-in module 112 may transmit an identifier corresponding to user 102 and/or user device 110 back to wireless beacons 122. Check-in module 112 may utilize communication module 118 of user device 110 to communicate with wireless beacons 122 (e.g., over near field communication, Bluetooth, Bluetooth Low Energy, radio, infrared, LTE Direct, or other communication protocol). The identifier from user device 110 may include, be transmitted with, concatenated with, or otherwise bundled with the identifier received from wireless beacons 122. Thus, wireless beacons 122 may identify the communication as associated with a connection request by wireless beacons 122. In other embodiments, different information may be transmitted to wireless beacons 122, such as an identifier for user 102, a name or other personal information for user 102, or other identifying information. Thus, the information transmitted to wireless beacons 122 does not need to be utilized to process and/or complete a check-in in all embodiments.

Once a connection is established with wireless beacons 122, the process may associate user 102 with the one or more of wireless beacons 122 used to connect to user device 110. For example, wireless beacons 122 may previous be registered as located at or nearby a specific area within transportation terminal 120 (e.g., at an entrance or walkway leading up to transportation terminal 120, at a payment counter/machine/turnstile for transportation fare at transportation terminal 120, at an access ramp/stairs at transportation terminal 120, etc.). Once user device 110 connects to one or more of wireless beacons 122, the check-in/connection information (e.g., the check-in information including an identifier and information for the check-in, such as the beacon(s) of wireless beacons 122 that user device 110 is connected to) may be transmitted to transportation server 130. Transportation server 130 may process the check-in information to determine if user 102 will utilize a transportation service available at transportation terminal 120, as will be explained in more detail herein. Transportation server 130 may further determine which transportation service user 102 will utilize, an availability of the transportation service, similar transportation services usable by user 102, and/or similar transportation terminals usable by user 102. As previously discussed, in other embodiments, a check-in need not be processed and/or completed to associate user 102 with the areas of the terminal. Thus, other connections and data transfers to wireless beacons 122 may be sufficient to associate user 102 with transportation terminal 120.

Once a connection is established with wireless beacons 122 by check-in module 112, check-in module 112 may be utilized to transmit further information to wireless beacons 122 for use by transportation server 130 in determining user 102 whether user 102 will utilize a transportation service, what transportation service/route/timeline is required by user 102, and/or other transportation services/terminals are usable by user 102, as will be explained in more detail herein. For example, check-in module 112 may access information stored to database 116, such as user personal information (e.g., an address for a work, home, friend, family, etc., a calendar/schedule of user 102, a travel route for user 102 (e.g., a route entered to a mapping application of user device 110), past travel history for user 102, and/or purchased fare for a transportation service). Such information may be transmitted to transportation server 130 for processing and/or previously stored by transportation server 130. Check-in module 112 may also interface with one or more APIs for applications and/or modules executed by user device 110 to retrieve such information. Check-in module 112 may also receive information from wireless beacons 122 and/or transportation server 130. Received information may correspond to a name/identifier of a transportation service that has been flagged for usage by user 102, an expected time for arrival for one or more transportation services, a capacity limit and/or current occupancy of a transportation service, a similar transportation service serving the same or similar route for user 102, and/or a nearby or similar transportation terminal for use by user 102. Such information may be presented to user 102 through a device interface of user device 102, and may allow user 102 to select additional information. For example, user 102 may request a different transportation service, purchase fare for a transportation service, and/or view a map to a transportation service in transportation terminal 120 or a nearby transportation terminal.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking, online payments, money transfer, or other applications associated with a payment provider. As previously discussed, other applications may include mapping applications, for example, through a GPS module that may identify user 102 at a location and/or calendaring/scheduling applications, which may be utilized to determine a service provider user 102 may utilize. Other applications 114 may include device interfaces and other display modules that may receive input from user 102 and/or output information to user 102. For example, other applications 114 may contain software programs, executable by a processor, including a graphical user interface (GUI) configured to provide an interface to the user.

User device 110 may further include database 116 stored to a transitory and/or non-transitory memory of user device 110, which may store various applications and data and be utilized during execution of various modules of user device 110. Thus, database 116 may include, for example, identifiers such as operating system registry entries, cookies associated with check-in module 112 and/or other applications 114, identifiers associated with hardware of user device 110, or other appropriate identifiers, such as identifiers used for payment/user/device authentication or identification.

Database 116 may include scheduling information, travel route information, calendaring information, personal information, purchase travel fare on a transportation service, and/or previous usage histories of one or more transportation service. Furthermore, database 116 may further include received information from transportation server 130, for example, locations and/or maps to transportation services within transportation terminal 120 or a nearby transportation terminal, time for arrival of transportation services, and/or transportation services information (e.g., name, number, etc.).

User device 110 includes at least one communication module 118 adapted to communicate with wireless beacons 122, transportation server 130, and/or transportation device 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 122 using short range communications, such as Bluetooth Low Energy, LTE Direct, WiFi, radio frequency, infrared, Bluetooth, and near field communications.

Transportation terminal 120 may correspond to a physical location where a user may access transportation services in order to travel between two or more locations. For example, transportation terminal 120 may correspond to a bus stop or station, a train or subway station, a taxi/car/shuttle service pickup location, a boat dock or pier station, or other location where a transportation service may provide a vehicle for transportation to user 102. Transportation terminal 120 may include further specialized software and/or hardware than displayed in environment 100, such as schedule announcement systems and/or fare payment systems. Transportation terminal 120 further includes wireless beacons utilized to provide transportation service management utilizing connections with communication devices. Thus, transportation terminal 120 includes wireless beacons 122. Transportation terminal 120 may also include communication modules and/or network interface components configured to communication with user device 110, transportation server 130, and/or transportation device 140 directly and/or over network 150.

Wireless beacons 122 may be maintained, for example, by a service provider, transportation provider, town/city planner, or other entity providing management of one or more transportation services. Wireless beacons 122 may be implemented using any appropriate hardware and software configured for wireless communication with user device 110, transportation server 130, and/or transportation device 140. For example, in one embodiment, wireless beacons 122 may be implemented as a dongle device including a hardware processor and a communication module, for example, connected to a device at transportation terminal 120 (e.g., a computing device having specialized hardware and/or software for management of transportation services). Wireless beacons 122 may also be implemented as a device incorporated within a personal computer (PC), a smart phone, laptop computer, and/or other types of computing devices capable of transmitting and/or receiving data, such as an IPAD® from APPLE®. Wireless beacons 122 may also act as a stand-alone device including a processor, communication module, and/or network interface component configured to communicate with user device 110, transportation server 130, and/or transportation device 140. Although a plurality of wireless beacons are described, a single wireless beacon may be utilized at the transportation terminal.

Wireless beacons 122 may be located at and throughout transportation terminal 120, including sub-areas of transportation terminal 120. Wireless beacons 122 of FIG. 1 contains processes, procedures, and/or applications, for example, a software program, executable by a hardware processor configured to interact with user device 110, transportation server 130, and/or transportation device 140. Thus, regardless of the implementation of wireless beacons 122, as discussed above, each of wireless beacons 122 utilize a check-in module 124 and a communication module 126. Check-in module 124 may correspond to executable processes, procedures, and/or applications with associated hardware. In other embodiments, wireless beacons 122 may include additional or different software and devices as required.

Check-in module 124 may correspond to an executable module having specialized hardware and/or software features for transmitting requests to establish a connection between a device (e.g., user device 110) and one of wireless beacons 122 transmitting the request to establish the connection. Thus, wireless beacons 122 may utilize short range wireless communications of wireless beacons 122 to transmit the requests to establish a connection, including an identifier such as a Universally Unique Identifier (UUID). If user device 110 receives a request to establish the connection with wireless beacons 122 and responds with a user device identifier (potentially including the UUID and other information necessary to effectuate a check-in of user device 110), check-in module 124 may cause wireless beacons 122 to ramp up in power and create a connection between user device 110 and wireless beacons 122.

Each of wireless beacons 122 may transmit the request to establish the connection with wireless beacons 122 as a short range wireless communication (e.g. a BLE protocol communication) including a "wake up" process for check-in module 112 of user device 110 and/or a token for wireless beacons 122. In other embodiments, the request and/or connection may utilize near field communication, radio communication, infrared communication, Bluetooth communication, or WiFi communication. Additionally, although wireless beacons 122 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 122 (e.g., user device 110) and establishment of a connection for data transfers.

The request may be specific to user device 110 by including information that is specific to user 102, such as a name, identifier, or user device identifier. The information specific to user 102 may be determined from a user account of user 102 or other information previously provided to transportation server 130. Thus, in certain embodiments, only user device 110 will pick up and authenticate the request. After check-in module 124 receives a user device identifier from user device 110, check-in module 124 may determine user 102 is in proximity to the beacon of wireless beacons 122 connected to user device 110. The beacon of wireless beacons 122 that connected to user device 110 may pass the user device identifier to transportation server 130 using check-in module 124. Thus, transportation server 130 may determine user device 110 is in proximity to the one or more of wireless beacons 122 connected to user device 110 through the connection between user device 110 and the connected beacon of wireless beacons 122, as will be discussed in more detail herein. As shown in FIG. 1, wireless beacons 122 may utilize communication module 126 of one of wireless beacons 122 to pass the identifier to transportation server 130. Additionally, check-in module 124 may cause wireless beacons 122 to keep a communication channel open with user device 110 for passing additional information between user device 110 and transportation server 130.

Check-in module 124 may also be utilized to request, retrieve, and/or receive information from user device 110 about user 102. For example, once a connection is established between user device 110 and one or more of wireless beacons 122, check-in module 124 may pull/receive/scrape information from user device 110, such travel routes, calendar information, personal information, purchased transportation service fare, prior travel on one or more transportation services, and/or preferred transportation services stored to database 116 of user device 110. Check-in module 124 may also transmit information to user device 110, such as a name/identifier of a transportation service that has been flagged for usage by user 102, an expected time for arrival for one or more transportation services, a capacity limit and/or current occupancy of a transportation service, a similar transportation service serving the same or similar route for user 102, and/or a nearby or similar transportation terminal for use by user 102. Requests generated by user 102 using user device 110 (e.g., requests for a schedule or flagging of a different transportation service and/or requests to purchase or reserve fare for a transportation service) may also be passed to transportation server 130 through wireless beacons 122 or directly by user device 110 using network 150.

In various embodiments, each of wireless beacons 122 include at least one communication module 126 adapted to communicate with user device 110, transportation server 130, and/or transportation device 140. Communication module 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 126 may communicate with user device 110 using short range communications, such as radio frequency, infrared, Bluetooth, and near field communications.

Transportation server 130 may be maintained, for example, by a service provider, which may provide management of transportation service, for example, as a transportation provider, town/city management, or other service provider. Transportation server 130 includes one or more processing applications which may be configured to interact with user device 110, wireless beacons 122, and/or transportation device 140 to provide transportation management services to user 102 and a transportation service associated with transportation device 140. Although only one server is shown, a plurality of servers and/or devices may function similarly. Although transportation server 130 is described as a server device, in various embodiments, transportation server 130 may function as a specialized device local to transportation terminal 120. Thus, in certain embodiments, transportation server 130 may communicate through wired or short range wireless communication with wireless beacons 122 to determine usage of transportation services by user 102 and flagging of a transportation service associated with transportation device 140. Furthermore, although transportation server 130 is shown as separate from transportation device 140, the below described modules, hardware, and functions may be included within one device/entity, such as one local to transportation terminal 120 or embodied as transportation device 140.

Transportation server 130 of FIG. 1 includes a terminal information processing module 132, other applications 134, a database 136, and a communication module 138. Terminal information processing module 132 and other applications 134 may correspond to executable processes, procedures, and/or applications with associated hardware. In other embodiments, transportation server 130 may include additional or different hardware and software as required.

Terminal information processing module 132 may correspond to one or more processes to execute modules and associated devices of transportation server 130 to determine a transportation service for use by user 102 using connections established by one or more of wireless beacons 122 with user device 110 and alert the transportation service of user 102 required usage at transportation terminal 120. In this regard, terminal information processing module 132 may correspond to specialized hardware and/or software utilized by transportation server 130 with wireless beacons 122 to receive check-in information (e.g., a communication device identifier for user device 110) including one or more connections between user device 110 and one or more of wireless beacons 122. Thus, the check-in information may include an identifier used for identification of user 102 and/or user device 110. Terminal information processing module 132 may utilize communication module 138 to receive the check-in information and store the check-in information to database 136 in a non-transitory memory of transportation server 130. The connection(s) between user device 110 and one or more of wireless beacons 122 may further include information identifying the connected beacon(s) of wireless beacons 122 that may be utilized by terminal information processing module 132 to determine which of wireless beacons 122 are connected to user device 110 and the locations of those beacons. Utilizing such information about transportation terminal 120 and/or subareas of transportation terminal 120 that user 102 has been detected in proximity to, a transportation service that user 102 may utilize at transportation terminal 120 may be determined. For example, through connections to wireless beacons 122, a position for user 102 may be determined and/or triangulated. Further, through additional connections established and ended between wireless beacons 122, a path that user 102 is travelling may be determined, such walking to a boarding ramp or payment station. Still further, a time or approximate time that user 102 has been located at transportation terminal 120 may be determined. Thus, terminal information processing module 132 may exclude users that are only quickly passing by or through transportation terminal 120. If user 102 is determined to be waiting at transportation terminal 120 based on location, path, and/or time information, terminal information processing module 132 may determine that user 102 wishes to access/utilize a transportation service available at transportation terminal 120.

Terminal information processing module 132 may receive the connection information from wireless beacons 122 in order to determine whether user 102 wishes to utilize a transportation service. Terminal information processing module 132 may further determine whether user 102 may utilize a transportation service available at transportation terminal 120 using information available about user 102, for example, information received from user device 110 and/or previous stored to database 136. Thus, once user device 110 connects to one or more of wireless beacons 122, information about the user device may be accessed, received, and/or retrieved by the beacon(s), as previously discussed. Such information may include travel routes, calendar information, personal information, purchased transportation service fare, prior travel on one or more transportation services, and/or preferred transportation services stored to database 116 of user device 110 or utilized by another application or module of user device 110. Terminal information processing module 132 may determine that user 102 will utilize a transportation service using the aforementioned information. In various embodiments, terminal information processing module 132 may further determine which transportation service should be used (e.g., a type of transportation service, a name of a transportation service, a number of the transportation service, a transportation service associated with a specific route for user 102, and/or time of arrival of a transportation service). Using the information determined about the transportation service for user by user 102, terminal information processing module 132 may generate an alert for the transportation service and alert the transportation service that user 102 requires transportation at transportation terminal 120, for example, through transportation device 140. For example, terminal information processing module 132 may access information about transportation services and routes for the transportation service from database 136. The transportation services information may include information about schedules, travel routes, and transportation service identification. Terminal information processing module 132 may utilize the transportation services information to determine the transportation service to alert of required use by user 102. The alert may display information for user 102 on transportation device 140, a location for user 102 and/or transportation terminal 120, other associated users wishing to utilize the transportation service at transportation terminal 120, fare payments by user 102 and/or other users, and/or other information determined by terminal information processing module 132.

In various embodiments, terminal information processing module 132 may receive information about the transportation service associated with transportation device 140 that user 102 wishes to utilize and/or transportation terminal 120. For example, terminal information processing module 132 may receive a notification from transportation device 140 (e.g., input by a driver, conductor, or other entity controlling the transportation service associated with transportation device 140) that indicates the transportation service associated with transportation device 140 is reaching or at maximum occupancy. Such information may be sent to transportation server 130 when close to or at maximum occupancy, at various time intervals, or when transportation device 140 receives the above described notification to server user 102 at transportation terminal 120. In such embodiments, terminal information processing module 132 may utilize the transportation services information about transportation services serving transportation terminal 120 to determine another transportation service that user 102 may utilize at transportation terminal 120. For example, a second bus travelling the required route by user 102 may be 10 minutes behind a first bus currently at transportation terminal 120 but at maximum capacity. Thus, terminal information processing module 132 may alert the second bus that user 102 will still require service when the second bus approaches transportation terminal 120. Of course, if user 102 chooses to leave transportation terminal 120 and/or board the first bus because there is room or a passenger departed at transportation terminal 120, the alert may be revoked by terminal information processing module 132.

Terminal information processing module 132 may provide information to user device 110 and/or transportation device 140. As previously discussed, information provided to transportation device 140 may include the alert that user 102 is waiting for the transportation service associated with transportation device 140 at transportation terminal 120, as well as information for identifying user 102 and/or allowing user 102 to board the transportation service (e.g., a name, image, other identifier, purchased fare, reserved fare and price to charge, destination endpoint, etc.). Similarly, user 102 may be provided, through user device 110, information about the transportation service, such as a name, number, other identifier, travel route, stop/endpoints, cost of fare and option to purchase fare, capacity and current occupancy, estimated time to arrival, location including a map coordinate or location (e.g., visible through a mapping application of user device 110), additional transportation services serving the same route for the user and their expected time of arrival, and/or other transportation terminals where the user may access and/or depart the transportation service. For example, user 102 may be alerted as user 102 is approaching or paying for fare at transportation terminal 120 that the estimated time to arrival or wait time for the transportation service may mean that user 102 may miss the transportation service. In other embodiments, the transportation service may be at maximum capacity. Thus, the user may visit another transportation terminal or may wait for another transportation service using the information provided by terminal information processing module 132.

Terminal information processing module 132 may also receive information from user device 110. For example, terminal information processing module 132 may receive a notification that the transportation service that terminal information processing module 132 has alerted for user 102 is incorrect based on a different travel route user 102 wishes to travel. User 102 may utilize an input device 110 with check-in module 132 to make a selection of another transportation service required by user 102. Thus, terminal information processing module 132 may instead generate a notification/alert for the requested transportation service and may assist user 102 with the requested transportation service as discussed above. Furthermore, terminal information processing module 132 may receive a payment request for a fare payment from user device 110. Terminal information processing module 132 may process the payment request, for example, using a payment provider, and provider a receipt having information used by the transportation service and/or transportation terminal 120 to provide admittance for user 102.

In various embodiments, transportation server 130 includes other applications 134 as may be desired in particular embodiments to provide features to transportation server 130. For example, other applications 134 may include security applications for implementing server-side security features, programmatic server applications for interfacing with appropriate application programming interfaces (APIs) over network 150, or other types of applications. Other applications 134 may contain software programs, executable by a processor, including a graphical user interface (GUI), configured to provide an interface to a user.

Additionally, transportation server 130 includes database 136. In various embodiments, transportation server 130 allow user 102 to establish user accounts with transportation server 130 that may include user information. For example, a transportation provider, town, city, or other service provider may allow user 102 to establish a user account or user information in database 136 that may be utilized when user device 110 connects to one or more of wireless beacons 122. Database 136 may further include check-in information having connections between user device 110 and one or more of wireless beacons 122, as well as information received from user device 110. Database 136 may information about transportation services serving transportation terminal 120, such as identification information, pricing, schedules, travel routes, and/or occupancy. Transportation server may further store information user with the transportation services, such as notifications transmitted to transportation device 140, requests from user device 110, etc.

In various embodiments, transportation server 130 includes at least one communication module 138 adapted to communicate user device 110, wireless beacons 122, and/or transportation device 140 over network 150. Communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate with wireless beacons 122 and/or transportation device 140 using short range communications, such as radio frequency, infrared, Bluetooth, and near field communications where transportation server 130 may be local to transportation terminal 120 or transportation device 140.

Transportation device 140 may be implemented as a communication device that may utilize appropriate hardware and software configured for wired and/or wireless communication with user device 110, wireless beacons 122, and/or transportation server 130. Transportation device 140 may be located locally to a transportation service, such as attached to a transportation service and visible or audible by a driver, conductor, or other administrator associated with the transportation service or in possession of the administrator. For example, in one embodiment, transportation device 140 may be implemented as a personal computer (PC), a smart phone, laptop/tablet computer, wristwatch with appropriate computer hardware resources, eyeglasses with appropriate computer hardware (e.g. GOGGLE GLASS®), other type of wearable computing device, display device include processing components, heads up display device, vehicle dashboard or console device, and/or other types of computing devices capable of transmitting and/or receiving data, such as an IPAD® from APPLE®. Although a transportation device is shown, the transportation device may be managed or controlled by any suitable processing device. Although only one transportation device is shown, a plurality of transportation devices may function similarly.

Transportation device 140 of FIG. 1 contains a transportation route module 142, other applications 144, a database 146, and a communication module 148. Transportation route module 142 and other applications 144 may correspond to executable processes, procedures, and/or applications with associated hardware. In other embodiments, transportation device 140 may include additional or different hardware and software as required.

Transportation route module 142 may correspond to one or more processes to execute modules and associated devices of transportation device 140 to receive information from transportation server 130 and display such information for use with a transportation service associated with transportation device 140. In this regard, transportation route module 142 may correspond to specialized hardware and/or software utilized by transportation device 140 with received information to display such alerts to an administrator of the transportation service. Transportation route module 142 may receive a notification and/or alert that user 102 is waiting at transportation terminal 120 and/or requires usage of the transportation service at transportation terminal 120. Such information may be displayed on an output device interface of transportation device 120. Transportation route module 142 may display the information as a text or audible alert or may display a map or direction for transportation terminal 120. Transportation route module 142 may further display information about user 102 as well as information about transportation terminal 120, such as other users requiring usage of the transportation service at transportation terminal 120. Transportation route module 142 may further display information about other transportation terminals and the required passengers at each transportation terminal. The administrator may utilize transportation route module 142 to communicate notifications to transportation server 130, such as notifications that the transportation service is at or reaching maximum occupancy.

In various embodiments, transportation device 140 includes other applications 144 as may be desired in particular embodiments to provide features to transportation device 140. For example, other applications 144 may include security applications for implementing client-side security features, programmatic client applications for interfacing with appropriate application programming interfaces (APIs) over network 150, or other types of applications. Other applications 144 may include device interfaces and other display modules that may receive input from an administrator for the transportation service associated with transportation device 140 and/or output information to the administrator. For example, other applications 144 may contain software programs, executable by a processor, including a graphical user interface (GUI) configured to provide an interface to the administrator.

Transportation device 140 may further include database 146 stored to a transitory and/or non-transitory memory of transportation device 140, which may store various applications and data and be utilized during execution of various modules of transportation device 140. Thus, database 146 may include, for example, identifiers such as operating system registry entries, cookies associated with transportation route module 142 and/or other applications 144, identifiers associated with hardware of transportation device 140, or other appropriate identifiers, such as identifiers used for payment/user/device authentication or identification. Database 146 may include scheduling information, travel route information, calendaring information, personal information, purchase travel fare on a transportation service, and/or previous usage histories of one or more transportation service. Furthermore, database 146 may further include received information from transportation server 130, for example, locations and/or maps to transportation services within transportation terminal 120 or a nearby transportation terminal, time for arrival of transportation services, and/or transportation services information (e.g., name, number, etc.).

Transportation device 140 includes at least one communication module 148 adapted to communicate with user device 110, wireless beacons 122, and/or transportation server 130. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacons 122 and/or transportation server 130 using short range communications, such as Bluetooth Low Energy, LTE Direct, WiFi, radio frequency, infrared, Bluetooth, and near field communications.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
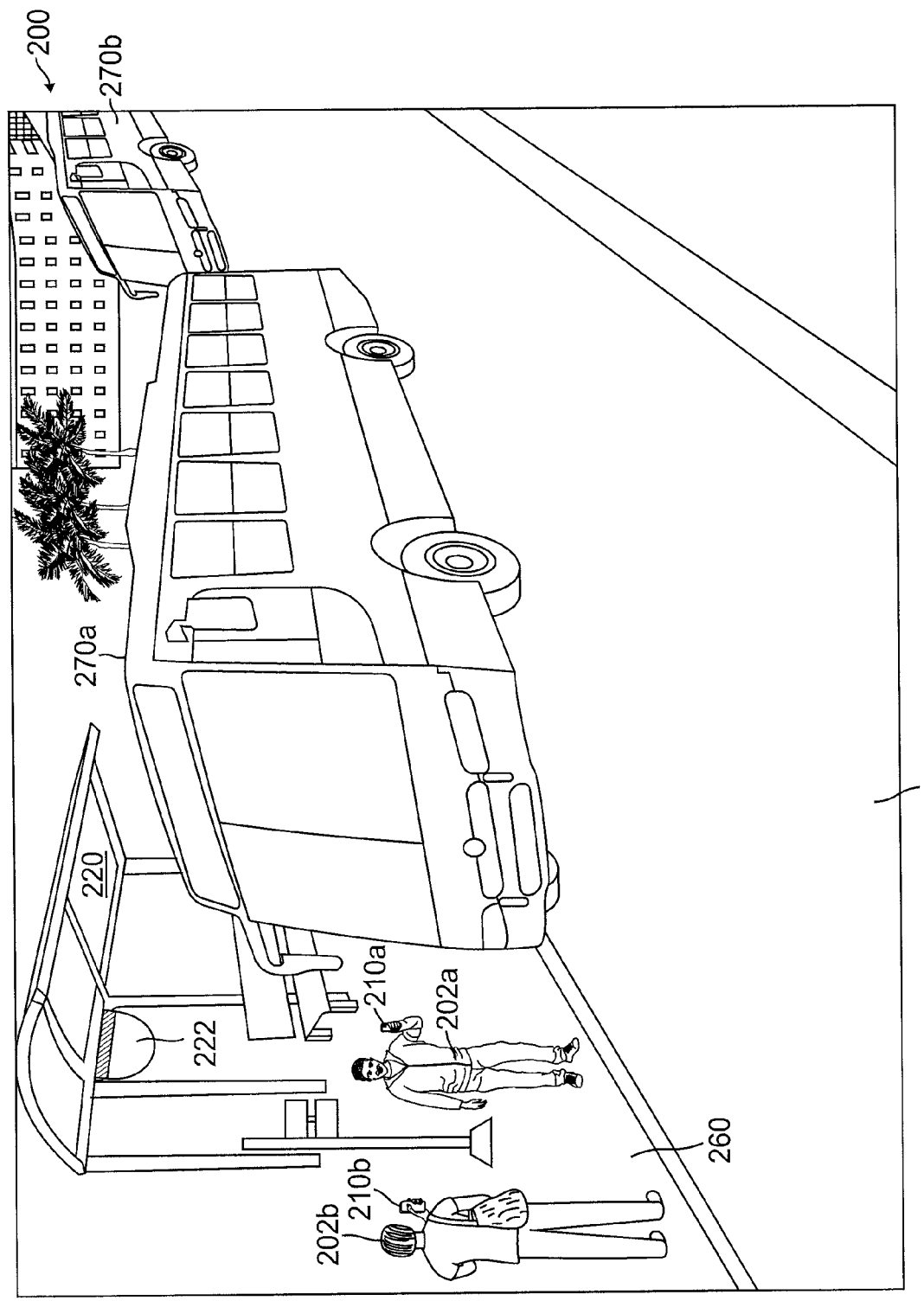
FIG. 2 is an exemplary environment having a wireless beacon device at a transportation terminal for use in alerting transportation services of users wishing to utilize the transportation services, according to an embodiment.

FIG. 2 is an exemplary environment having a wireless beacon device at a transportation terminal for use in alerting transportation services of users wishing to utilize the transportation services, according to an embodiment. Environment 200 of FIG. 2 includes a user 202*a* having a user device 210*a* and a user 20*b* having a user device 210*b* both corresponding generally to user 102 and user device 110, respectively, of FIG. 1. Environment 200 also includes a transportation terminal 220 and a wireless beacon 222 corresponding generally to transportation terminal 120 and wireless beacon 122, respectively, of FIG. 1.

In environment 200, a transportation service 270*a* and a transportation service 270*b* are located on a street 262 travelling along a travel route between two or more locations. For example, transportation service 270*a* may travel between transportation terminal 220 and a first endpoint, while transportation service 270*b* may travel between transportation terminal 220 and the first endpoint and/or a second endpoint. In environment 200, transportation service 270*a* is currently located at transportation terminal 220 and awaiting passengers to board the transportation service. User 202*a* is located at transportation terminal 220 and is in possession of user device 210*a*. As previously discussed, user device 210*a* may connect with wireless beacon 222 located at transportation terminal 220 and transmit information from the connection to a device or server associated with transportation service 270*a* for processing. The device/server may have previously alerted or is presently alerting transportation service 270*a* that user 202*a* is at transportation terminal 220 and requires transportation. Thus, transportation service 270*a* may stop and wait at transportation terminal 220 in order to provide transportation to transportation service 270*a*.

Additionally, user 202*b* is shown approaching transportation terminal 220 from sidewalk 260. User 202*b* is in possession of user device 210*b* as user 202*b* approaches transportation terminal 220. User device 210*b* may similarly connect to wireless beacon 222 so that a device/server associated with transportation terminal 220 and/or transportation service 270*a* may determine that user 202*b* is in proximity to transportation terminal 220. Since user 202*b* is approaching but not quite at transportation terminal 220, transportation service 270*a* may be alerted/notified to wait at transportation terminal 220 for user 202*b*. However, if transportation service 270*a* cannot wait for user 202*b* or is at maximum capacity, user 202*b* may be informed through user device 210*b*. User device 210*b* may further display nearby transportation terminals or may display a wait time for transportation service 270*b* that is approaching transportation terminal 220, including when transportation service 270*b* is running ahead or behind schedule and an estimated time of arrival. If transportation service 270*b* also matches the required route by user 202*b*, transportation service 270*b* may be notified to stop at transportation terminal 220 in order to provide transportation to user 202*b* when user 202*b* arrives at transportation terminal 220. However, if transportation service 270*b* does not provide the required travel route by user 202*b*, user 202*b* may be given further options (e.g., a wait time for transportation service 270*a* to return) through user device 210*b*.

Of course, a plurality of wireless beacons at a plurality of different transportation terminals may be utilized to optimize a travel system that incorporates transportation service 270*a*, transportation service 270*b*, and/or other transportation service. For example, transportation service 270*a* may pick up one or more passengers (e.g., user 202*a* and/or user 202*b*) that are travelling to a first stop location at transportation terminal 220. The stop location may be designated by such passengers when arriving at transportation terminal 220 or through an itinerary or purchased fare by the passengers. Transportation service 270*a* may pick up all passengers travelling to the first stop location so that when transportation service 270*b* arrives at transportation terminal 220, transportation service 270*b* is not required to make a stop at the first stop location. Instead, transportation service 270*b* may pick up all passengers travelling to a second stop location. Such passengers travelling to the second stop location may be alerted that transportation service 270*b* is travelling to the second stop location and thus wait for transportation service 270*b* and bypass transportation service 270*a* since transportation service 270*a* will be stopping at the first stop location. This further allows transportation service 270*a* to skip the second stop location.

Figure 3:
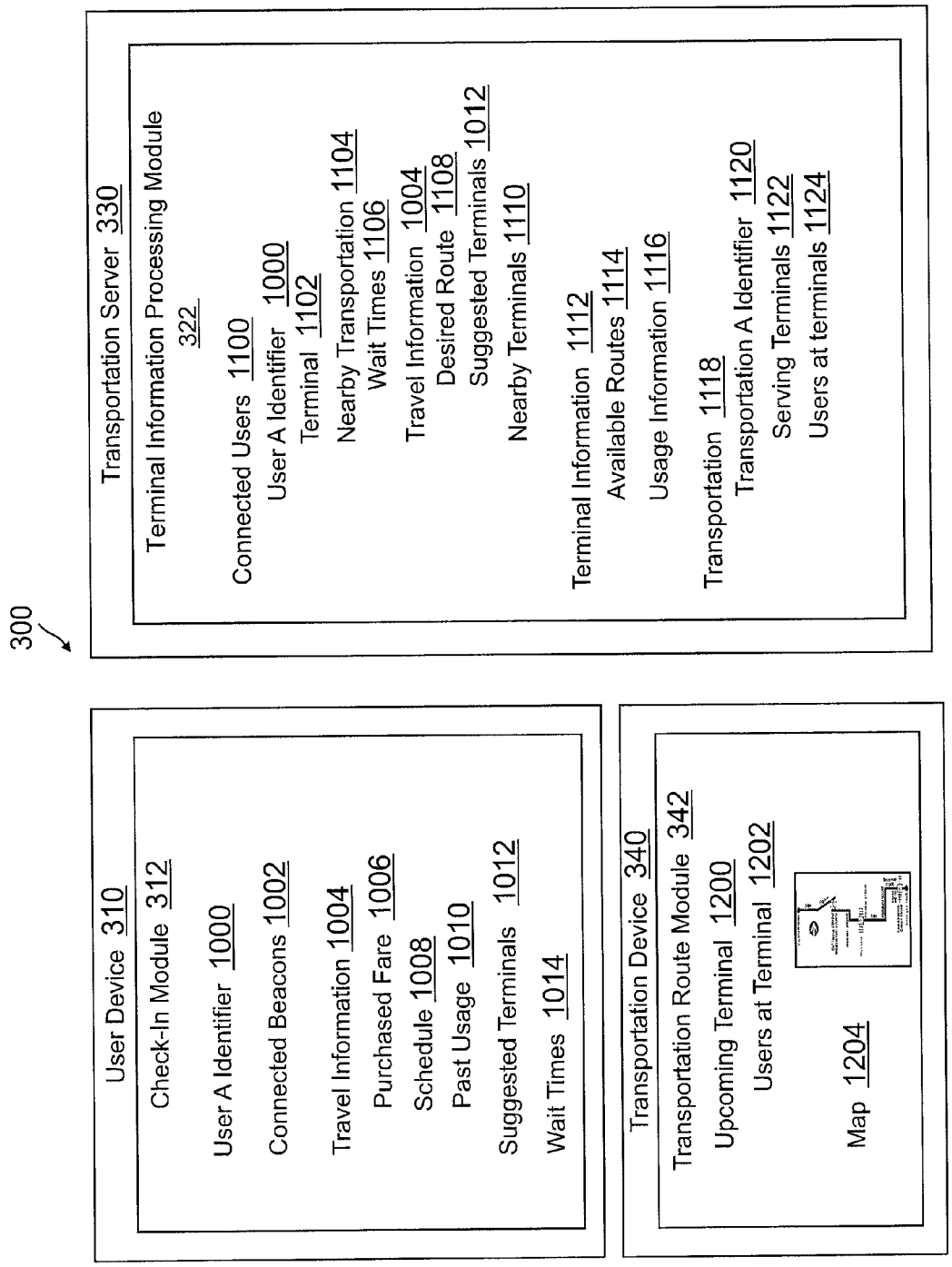
FIG. 3 is an exemplary system environment having a transportation server receiving an alert that a user device has connected to a wireless beacon at a transportation terminal and alerting a transportation service's device that a user may wish to utilize the transportation service at the transportation terminal, according to an embodiment.

FIG. 3 is an exemplary system environment having a transportation server receiving an alert that a user device has connected to a wireless beacon at a transportation terminal and alerting a transportation service's device that a user may wish to utilize the transportation service at the transportation terminal, according to an embodiment. Environment 300 of FIG. 3 includes a user device 310, a transportation server 330, and a transportation device 340 corresponding generally to user device 110, transportation server 130, and transportation device 340, respectively, of FIG. 1.

User device 310 executes a check-in module 312 corresponding generally to the specialized hardware and/or software modules and processes described in reference to check-in module 112 of FIG. 1. Check-in module 312 accesses and/or stores a user A identifier 1000 that may be utilized in established a connection and/or check-in information for user device 310. As previously discussed, check-in module 312 may be utilized to establish connections with one or more wireless beacons. In this regard, user A identifier 1000 may be transmitted to the beacon(s), and check-in module 312 may cause user device 310 to form a connection with the beacon(s). Once connected, check-in module 312 may track connected beacons 1002. Further check-in module 312 may access, such as through receiving from an API of another application or module, retrieving from a non-transitory memory of user device 310, and/or scraping from one or more resources, information about user A associated with user device 310. Such information may include travel information 1004, including purchased fare 1004 for a transportation service and/or route, a schedule 1008 for user A (e.g., a calendar), and past usage 1010 of transportation services, terminals, and/or routes.

Transportation server 330 may receive user A identifier 1000 as well as travel information 1004 from the beacon(s) in connected beacons 1002. Transportation server 330 executes a terminal information processing module 322 corresponding generally to the specialized hardware and/or software modules and processes described in reference to terminal information processing module 132 of FIG. 1. Terminal information processing module 322 may be utilized to alert one or more transportation services of user A's required use at a transportation terminal. Thus, terminal information processing module 322 receives user A identifier 1000 and logs the identifier under connected users 1100. Connected users 1100 may further include other identifiers associated with other users having communication devices connected to one or more wireless beacons. Connected users 1100 includes user A identifier 1000 with associated information corresponding to the one or more wireless beacons connected to user device 310 and/or retrieved from user device 310. For example user A identifier 1000 is associated with a terminal 1102 for the connected wireless beacon, nearby transportation 1104 with wait times 1106 determined from transportation services information, travel information 1004 having a desired route 1108 and suggested terminals 1012 determined from information pulled from user device 110 (e.g., travel information 1004), and nearby terminals 1110 determined from a map or location information. The aforementioned information may be utilized to determine notifications/alerts sent to flag a transportation service to assist user A associated with user device 310 and/or alert user A through user device 310 of current transportation services occupancy, travel routes, and/or wait times.

The information under user A identifier 1000 may be determined using transportation services information, which may include travel, vehicle of travel, and/or terminal location information. Thus, transportation services information may include terminal information 1112 for one or more terminals serviced by a transportation service. Terminal information 1112 includes available routes 1114 and usage information 1116. Further transportation services information may include transportation 1118, for example, information associated with one or more transportation services. Transportation 1118 includes transportation A identifier 1120 for identifying a specific transportation service, as well associated information with transportation A, such as serving terminals 1122 and users at terminals 1124.

Notifications to alert a transportation service of user A's required usage may be sent to transportation device 340 associated with the transportation service. Transportation device 340 executes a transportation route module 342 corresponding generally to the specialized hardware and/or software modules and processes described in reference to transportation route module 142 of FIG. 1. Transportation route module 342 map therefore display the notifications so that a driver, conductor, or other administrator may pick up user A at a designated transportation terminal. In this regard, transportation route module 342 includes upcoming terminal 1200 having users at terminal 1202, which may include user A as well as other users that may require usage of the transportation service. Transportation route module 342 may also display the transportation terminals and/or the users requiring usage of the transportation terminal on map 1204.

As previously discussed, terminal information processing application 332 may also send notifications to user device 310 about statuses of transportation service(s) and/or transportation terminal(s) In this regard, check-in module 312 may also receive suggested terminals 1012 for user A and/or wait times 1014 for one or more transportation services.

Check-in module 312 may utilize one or more output interfaces to communicate the information to user A.

Figure 4:
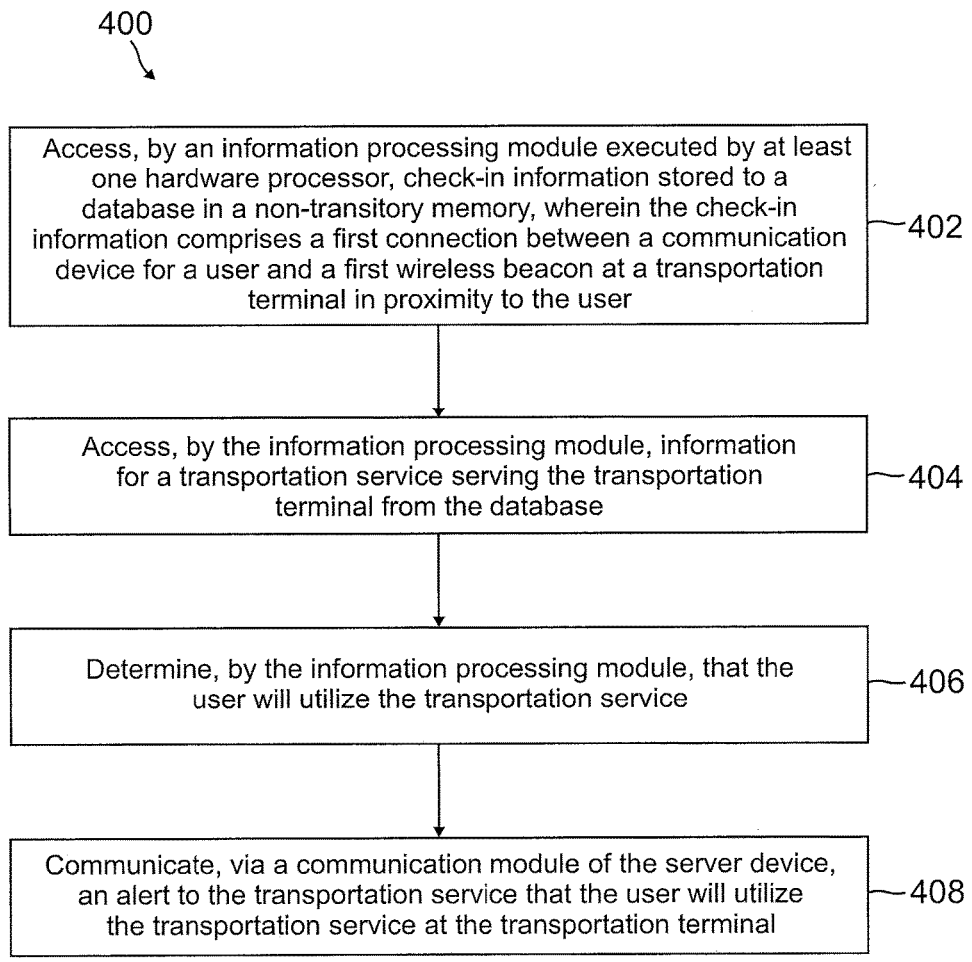
FIG. 4 is a flowchart of an exemplary process for wireless beacon devices for use in managing transportation service terminals, according to an embodiment.

FIG. 4 is a flowchart of an exemplary process for wireless beacon devices for use in managing transportation service terminals, according to an embodiment. Note that one or more steps, processes, and methods described herein may be omitted, performed in a different sequence, or combined as desired or appropriate, as well as be performed by different modules, entities, components, or systems.

At step 402, an information processing module, executed by at least one hardware processor, accesses check-in information stored to a database in a non-transitory memory, wherein the check-in information comprises a first connection between a communication device for a user and a first wireless beacon at a transportation terminal in proximity to the user. The check-in information may instead be or include a communication device identifier and/or connection information about the first connection. The first connection may utilize one of near field communication, radio communication, infrared communication, Bluetooth communication, Bluetooth Low Energy (BLE) communication, WiFi communication, and LTE Direct communication.

The information processing module accesses information for a transportation service serving the transportation terminal from the database, at step 404. At step 406, the information processing module determines that the user will utilize the transportation service, for example using the information for the transportation service and/or the check-in information. The transportation service may comprise one of a bus, a train, a subway, a car service, a taxi service, a boat service, and a shuttle service, and wherein the first device comprises a first device attached to first transportation service for displaying the first communication to a second user associated with the first transportation service. It may also be determined that the user will utilize the transportation service using a length of time for the connection between the communication device and the first wireless beacon.

At step 408, a communication module of the server device communicates an alert to the transportation service that the user will utilize the transportation service at the transportation terminal. The transportation service may also receive personal information and/or payment/fare information for the user received from communication device, for example, using the wireless beacon connection. Moreover, additional users may arrive at the transportation terminal so that their communication devices connected to the wireless beacon. As described above, the alert may include the number of users at the transportation terminal, as well as a number of users at other transportation terminals, using communication device and wireless beacon connections. Such information may be displayed on a map on a device for the transportation service.

In various embodiments, the user may receive information about the arrival of the transportation service, such as a wait time and/or identification information for the transportation service. The information processing module may also determine on or more other transportation services serving the transportation terminal and alert the transportation services of the users at the transportation terminal For example, the first transportation service may communicate an notification that the transportation service is at or reaching a maximum capacity/occupancy. Thus, a second transportation service may be required at the transportation terminal. In such an embodiment, the user may also be alerted of the status of the first transportation provider so that they may determine whether to utilize the second transportation provider or another transportation terminal. The user may also determine that the first transportation service is not required by the user, and may instead select a second transportation service to flag at the transportation terminal.

Figure 5:
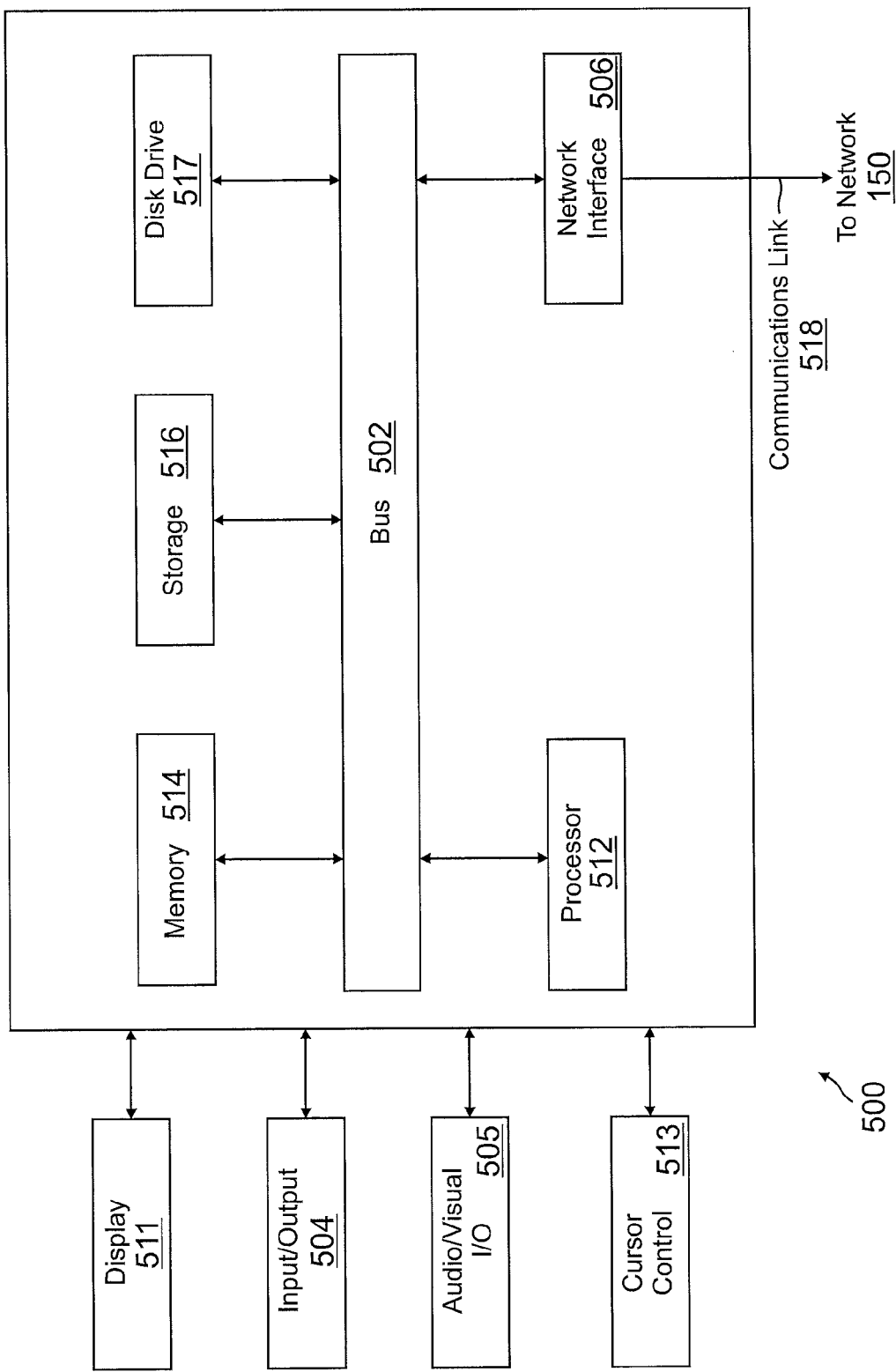
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in Ruin and detail without departing from the scope of the present disclosure. Thus, the present disclosure is limited only by the claims.

What is claimed is:

1. A system comprising:
    one or more computer-readable memories storing program instructions; and
    one or more processors configured to execute the program instructions to cause the system to perform operations comprising:
        detecting reception of a first communication device identifier for a first communication device by a first beacon device of a plurality of beacon devices associated with a first transportation terminal, wherein the first communication device identifier is received by the first beacon device via a first connection;
        detecting reception of the first communication device identifier by a second beacon device of the plurality of beacon devices, wherein the first communication device identifier is received by the second beacon device via a second connection, established after the first connection, and wherein the second beacon device is located within the first transportation terminal; and
        in response to the detecting the reception of the first communication device identifier by the second beacon device, automatically performing a check-in of the first communication device with a first transportation service associated with the first transportation terminal.

2. The system of claim 1, wherein the automatically performing the check-in of the first communication device includes determining the first transportation service from a plurality of transportation services associated with the first transportation terminal based on information associated with a user of the first communication device.

3. The system of claim 2, wherein the information associated with the user of the first communication device includes a schedule or calendar associated with the user of the first communication device.

4. The system of claim 2, wherein the information associated with the user of the first communication device includes historical travel information associated with the user of the first communication device or information identifying a travel fare purchased by the user of the first communication device.

5. The system of claim 1, wherein the first beacon device is located in a location that is different from the first transportation terminal.

6. The system of claim 1, wherein the automatically performing the check-in of the first communication device includes transmitting a notification to a server of the first transportation service that includes identification information of a user of the first communication device and travel information associated with the user of the first communication device.

7. The system of claim 1, wherein the automatically performing the check-in of the first communication device includes determining that the first communication device is located within a threshold distance of the second beacon device for an amount of time that exceeds a threshold amount of time.

8. The system of claim 1, wherein the automatically performing the check-in of the first communication device includes accessing one or more applications of the first communication device in order to identify and retrieve user information associated with a user of the first communication device.

9. The system of claim 8, wherein the user information associated with the user of the first communication device includes identification information or information describing transportation preferences.

10. A method comprising:
    detecting reception of a first communication device identifier for a first communication device by a first beacon device of a plurality of beacon devices, wherein the first communication device identifier is received by the first beacon device via a first connection;
    detecting reception of the first communication device identifier by a second beacon device of the plurality of beacon devices, wherein the first communication device identifier is received by the second beacon device via a second connection, established after the first connection, wherein the second beacon device is located in a location that is different from the first beacon device; and in response to the detecting the reception of the first communication device identifier by the second beacon device, automatically identifying a first transportation service from a plurality of transportation services based on information associated with a user of the first communication device, and automatically performing a check-in of the first communication device with the first transportation service.

11. The method of claim 10, wherein the information associated with the user of the first communication device includes historical travel information associated with the user of the first communication device.

12. The method of claim 10, wherein the information associated with the user of the first communication device includes a schedule or calendar associated with the user of the first communication device.

13. The method of claim 10, wherein the automatically performing the check-in of the first communication device includes transmitting a notification to a server of the first transportation service that includes personal information of the user of the first communication device and travel information associated with the user of the first communication device.

14. The method of claim 10, wherein the automatically performing the check-in of the first communication device further includes determining that the first communication device is located within a threshold distance of the second beacon device for an amount of time that exceeds a threshold amount of time.

15. The method of claim 10, wherein the automatically performing the check-in of the first communication device includes accessing one or more applications of the first communication device in order to identify and retrieve information describing transportation preferences associated with the user of the first communication device.

16. A non-transitory computer readable medium storing program instructions, the program instructions when executed cause a machine to perform operations comprising:
    detecting reception of a first communication device identifier for a first communication device by a first beacon device of a plurality of beacon devices associated with a first transportation terminal, wherein the first communication device identifier is received by the first beacon device via a first connection;
    detecting reception of the first communication device identifier by a second beacon device of the plurality of beacon devices, wherein the first communication device identifier is received by the second beacon device via a second connection, established after the first connection, and wherein the second device beacon is located within the first transportation terminal; and
    in response to the detecting the reception of the first communication device identifier by the second beacon device, automatically performing a check-in of the first communication device with a first transportation service associated with the first transportation terminal.

17. The non-transitory computer readable medium of claim 16, wherein the automatically performing the check-in of the first communication device includes transmitting a notification to a server of the first transportation service that includes personal information of a user of the first communication device and travel information associated with the user of the first communication device.

18. The non-transitory computer readable medium of claim 17, wherein the automatically performing the check-in of the first communication device further includes determining that the first communication device is located within a threshold distance of the second beacon device for an amount of time that exceeds a threshold amount of time.

19. The non-transitory computer readable medium of claim 16, wherein the automatically performing the check-in of the first communication device includes accessing one or more applications of the first communication device in order to identify and retrieve information describing transportation preferences associated with a user of the first communication device.

20. The non-transitory computer readable medium of claim 16, wherein the automatically performing the check-in of the first communication device includes communicating with a second transportation service and determining that the second transportation service does not have capacity for a user of the first communication device, wherein a travel preference associated with the user of the first communication device prioritizes the second transportation service above the first transportation service.

* * * * *

UNITED STATES PATENT AND TRADEMARK OFFICE
CERTIFICATE OF CORRECTION

| | |
|---|---|
| PATENT NO. | : 9,974,000 B2 |
| APPLICATION NO. | : 15/444064 |
| DATED | : May 15, 2018 |
| INVENTOR(S) | : Michael Charles Todasco et al. |

It is certified that error appears in the above-identified patent and that said Letters Patent is hereby corrected as shown below:

In the Specification

In Column 2, Line 7, change "service terminals" to --service terminals.--.

In Column 14, Line 44, change "GOGGLE" to --GOOGLE--.

In Column 21, Line 49, change "Ruin and detail" to --form and detail.--.

Signed and Sealed this
Third Day of July, 2018

Andrei Iancu
*Director of the United States Patent and Trademark Office*